United States Patent
Cicchini

(10) Patent No.: US 11,002,223 B2
(45) Date of Patent: May 11, 2021

(54) FLIGHT VEHICLE WITH AIR INLET ISOLATOR HAVING WEDGE ON INNER MOLD LINE

(71) Applicant: Raytheon Company, Waltham, MA (US)

(72) Inventor: Nicholas P. Cicchini, Vail, AZ (US)

(73) Assignee: Raytheon Company, Waltham, MA (US)

(*) Notice: Subject to any disclaimer, the term of this patent is extended or adjusted under 35 U.S.C. 154(b) by 353 days.

(21) Appl. No.: 15/833,526

(22) Filed: Dec. 6, 2017

(65) Prior Publication Data

US 2019/0170089 A1    Jun. 6, 2019

(51) Int. Cl.
*F02K 7/10*    (2006.01)
*B64D 27/20*    (2006.01)
(Continued)

(52) U.S. Cl.
CPC .............. *F02K 7/10* (2013.01); *B64C 23/04* (2013.01); *B64C 30/00* (2013.01); *B64D 27/20* (2013.01);
(Continued)

(58) Field of Classification Search
CPC ... B64C 30/00; B64C 23/04; B64D 2033/026; B64D 33/02; B64D 27/20; F02C 7/04;
(Continued)

(56) References Cited

U.S. PATENT DOCUMENTS

| | | | | |
|---|---|---|---|---|
| 2,788,183 | A | * | 4/1957 | Ferri .................. F02C 7/04 244/53 B |
| 2,975,587 | A | * | 3/1961 | Rae .................. F42B 15/00 138/44 |

(Continued)

FOREIGN PATENT DOCUMENTS

| | | |
|---|---|---|
| EP | 1 445 465 | 8/2004 |
| EP | 1 898 080 | 3/2008 |

(Continued)

OTHER PUBLICATIONS

Gun'ko, Yu., and I. Mazhul'. "Numerical Investigation of Flow Past a System of Two Sweptback Compression Wedges." Fluid Dynamics, vol. 49, No. 2, Mar. 2014, pp. 259-269. EBSCOhost, doi:10.1134/S0015462814020148. (Year: 2014).*

(Continued)

*Primary Examiner* — Alain Chau
(74) *Attorney, Agent, or Firm* — Renner, Otto, Boisselle & Sklar, LLP

(57) ABSTRACT

A flight vehicle engine includes an isolator with a swept-back wedge to improve flow mixing. The wedge includes forward shock-anchoring locations, such as edges or rapidly-curved portions, that anchor oblique shocks in situations where the isolator has sufficient back pressure. The swept-back wedge may also create swept oblique shocks along its length. Boundary layer flow streamlines are diverted running parallel to or parallel but moving outward conically to the swept-wedge leading edge moving outboard and upward. The non-viscous flow outside the boundary (Continued)

layer is processed through the swept-back ramp shock and diverted outboard and upward as well. The outboard aft portion of the wedge at the sidewall intersection may also induce shocks and divert flow near the walls closer toward the walls and upward, and/or improve flow mixing.

13 Claims, 6 Drawing Sheets

(51) Int. Cl.

| | |
|---|---|
| F02K 7/08 | (2006.01) |
| F02C 7/04 | (2006.01) |
| B64C 23/04 | (2006.01) |
| F42B 10/38 | (2006.01) |
| F42B 10/42 | (2006.01) |
| F42B 15/10 | (2006.01) |
| F02K 7/00 | (2006.01) |
| B64C 30/00 | (2006.01) |
| B64D 33/02 | (2006.01) |

(52) U.S. Cl.
CPC ............ *B64D 33/02* (2013.01); *F02C 7/04* (2013.01); *F02K 7/00* (2013.01); *F02K 7/08* (2013.01); *F42B 10/38* (2013.01); *F42B 10/42* (2013.01); *F42B 15/10* (2013.01); *B64D 2033/026* (2013.01); *F05D 2220/10* (2013.01); *F05D 2250/51* (2013.01); *Y02T 50/60* (2013.01)

(58) Field of Classification Search
CPC .... F02K 7/10; F05D 2220/10; F05D 2250/50; F05D 2220/51; F05D 2220/511; F05D 2220/512

See application file for complete search history.

(56) References Cited

U.S. PATENT DOCUMENTS

| | | | |
|---|---|---|---|
| 2,989,846 A | 6/1961 | Hausammann | |
| 3,027,118 A * | 3/1962 | Willox | B64C 30/00 244/15 |
| 3,027,711 A * | 4/1962 | Rae | F02C 7/04 244/74 |
| 3,062,484 A * | 11/1962 | Himka | F02C 7/04 244/53 R |
| 3,066,892 A * | 12/1962 | Smith | F02C 7/042 244/53 B |
| 3,417,767 A * | 12/1968 | Young | F02C 7/042 137/15.2 |
| 3,777,488 A | 12/1973 | Gross et al. | |
| 5,058,837 A | 10/1991 | Wheeler | |
| 5,082,206 A | 1/1992 | Kutschenreuter et al. | |
| 5,301,901 A * | 4/1994 | Kutschenreuter, Jr. | B64D 33/02 137/15.1 |
| 5,598,990 A * | 2/1997 | Farokhi | B64C 23/06 244/200.1 |
| 5,660,040 A * | 8/1997 | Henry | F02K 7/10 60/204 |
| 5,749,542 A * | 5/1998 | Hamstra | B64C 23/005 244/53 B |
| 5,779,189 A * | 7/1998 | Hamstra | B64C 7/00 137/15.1 |
| 5,881,758 A | 3/1999 | Koncsek et al. | |
| 6,793,175 B1 | 9/2004 | Sanders et al. | |
| 7,048,229 B2 | 5/2006 | Sanders et al. | |
| 7,207,520 B2 * | 4/2007 | Lundy | G06F 30/15 244/53 B |
| 8,256,706 B1 * | 9/2012 | Smith | B64D 33/02 244/53 B |
| 8,292,217 B2 * | 10/2012 | Smith | B64C 30/00 244/53 B |
| 8,403,271 B2 * | 3/2013 | Domel | B64C 30/00 244/200 |
| 8,434,723 B2 | 5/2013 | Simpson et al. | |
| 8,656,957 B2 | 2/2014 | Babinsky et al. | |
| 8,662,453 B2 * | 3/2014 | Richards | F02K 1/30 244/207 |
| 9,447,731 B1 | 9/2016 | Adamson et al. | |
| 9,758,253 B2 * | 9/2017 | Troia | B64D 33/02 |
| 9,874,144 B2 * | 1/2018 | Huynh | B64D 33/02 |
| 9,896,219 B2 * | 2/2018 | Adamson | B64D 33/02 |
| 10,190,539 B2 * | 1/2019 | Bowcutt | F02C 7/045 |
| 2006/0107648 A1 | 5/2006 | Bulman et al. | |
| 2007/0235590 A1 | 10/2007 | Kohoshkin et al. | |
| 2008/0060361 A1 | 3/2008 | Morrison et al. | |
| 2008/0092519 A1 | 4/2008 | Bulman | |
| 2008/0128547 A1 | 6/2008 | Pederson et al. | |
| 2008/0271787 A1 * | 11/2008 | Henne | F02C 7/04 137/15.1 |
| 2008/0283677 A1 | 11/2008 | Pederson et al. | |
| 2009/0313968 A1 * | 12/2009 | Smith | F02C 7/042 60/224 |
| 2010/0181436 A1 * | 7/2010 | Richards | F02K 1/30 244/53 B |
| 2012/0049008 A1 | 3/2012 | Domel et al. | |
| 2012/0325325 A1 * | 12/2012 | Quackenbush | F02C 7/04 137/1 |
| 2014/0182697 A1 | 7/2014 | Davidenko et al. | |
| 2014/0224949 A1 | 8/2014 | Rybalko et al. | |
| 2016/0244177 A1 * | 8/2016 | Adamson | B64D 33/02 |
| 2016/0273452 A1 * | 9/2016 | Huynh | B64D 33/02 |
| 2016/0376018 A1 * | 12/2016 | Troia | B64C 23/06 244/53 B |
| 2017/0002768 A1 * | 1/2017 | Bowcutt | F02C 7/042 |

FOREIGN PATENT DOCUMENTS

| | | |
|---|---|---|
| GB | 911 074 A | 11/1962 |
| RU | 2 343 297 C1 | 1/2009 |
| WO | 2017/158857 | 9/2017 |

OTHER PUBLICATIONS

Gun'ko, Yu., and I. Mazhul'. "Supersonic Flow Pasta System of Two Swept Wedges Mounted on a Preliminary Compression Surface." Fluid Dynamics, vol. 48, No. 2, Mar. 2013, pp. 260-270. EBSCOhost, doi:10.1134/S0015462813020130. (Year: 2013).*

Gounko, Yu. P., and I. I. Mazhul. "Supersonic Flow over Paired Compression Wedges of Different Sweep Installed on the Pre-Compression Surface." Thermophysics and Aeromechanics, No. 1, 2015, p. 1. EBSCOhost, doi:10.1134/S0869864315010011. (Year: 2015).*

International Search Report and Written Opinion for corresponding International Application No. PCT/US2018/041754 dated Nov. 7, 2018.

Search Report issued by WIPO in corresponding PCT application No. PCT/US18/41754 dated Nov. 7, 2018.

Maheswaran et al., "Computational Analysis the Effect of Micro Vortex Generator in E2R Scramjet Engine", May 2013, International Journal of Engineering Research & Technology.

Sabean et al., "Computational Optimization of a Hypersonic Rectangular-to-Circular Inlet", Journal of Propulsion and Power, vol. 17, No. 3, May-Jun. 2001, pp. 571-578.

Sabean et al., "Optimization of a Hypersonic Inlet with a Rectangular to Circular Transition", American Institute of Aeronautics & Astronautics, AIAA 99-0612, 1999, pp. 1-9.

Pending claims of co-pending U.S. Appl. No. 15/468,441, filed Mar. 24, 2017.

Pending claims of co-pending U.S. Appl. No. 15/615,146, filed Jun. 6, 2017.

Pending claims of co-pending U.S. Appl. No. 15/615,152, filed Jun. 6, 2017.

(56) References Cited

OTHER PUBLICATIONS

Gounko et al., "Numerical investigation of flow over two sweepback wedges at M = 4 and 6", Thermophysics and Aeromechanics, vol. 20, No. 2, 2013, pp. 179-193.
Settles et al., "Investigation of Three-Dimensional Shock/Boundary-Layer Interactions at Swept Compression Corners", AIAA Journal, vol. 18, No. 7, Jul. 1980, pp. 779-785.
Settles et al., "Cylindrical and Conical Flow Regimes of Three-Dimensional Shock/Boundry-Layer Interactions", AIAA Journal, vol. 22, Feb. 1984, pp. 194-200.
Inger, "Supersonic Viscous-Inviscid Interaction of a Swept Ramp with a Turbulent Boundary Layer", AIAA-85-1669, Jul. 1985, 60 pages.
Stalker, "Spanwise Propagation of Disturbances in Swept Shock Wave-Boundary Layer Interactions", AIAA-82-0988, Jun. 1982, 9 pages.
Zheltovodov et al., "Shock Wave-Boundary-Layer Interactions", Chapter 5.3.4 "Swept Compression Ramp; Interaction and Its Modeling", 2011, pp. 230-237.

* cited by examiner

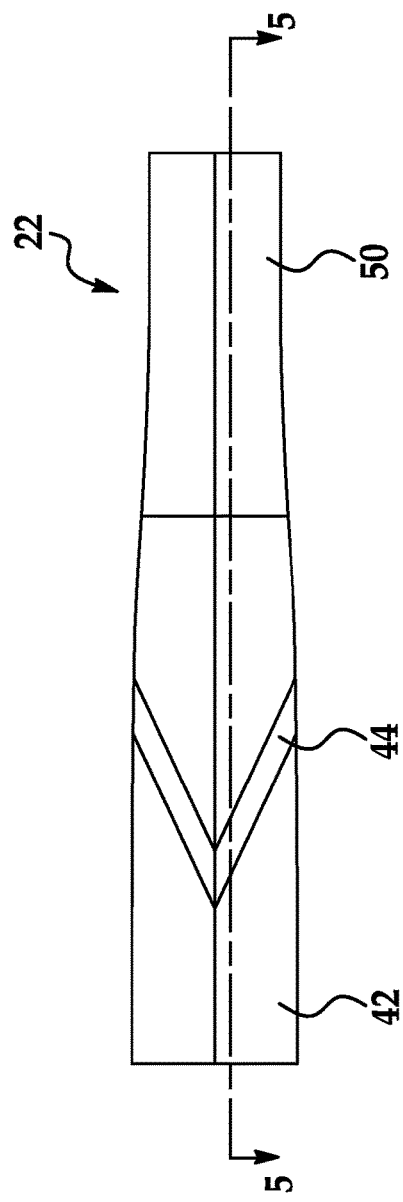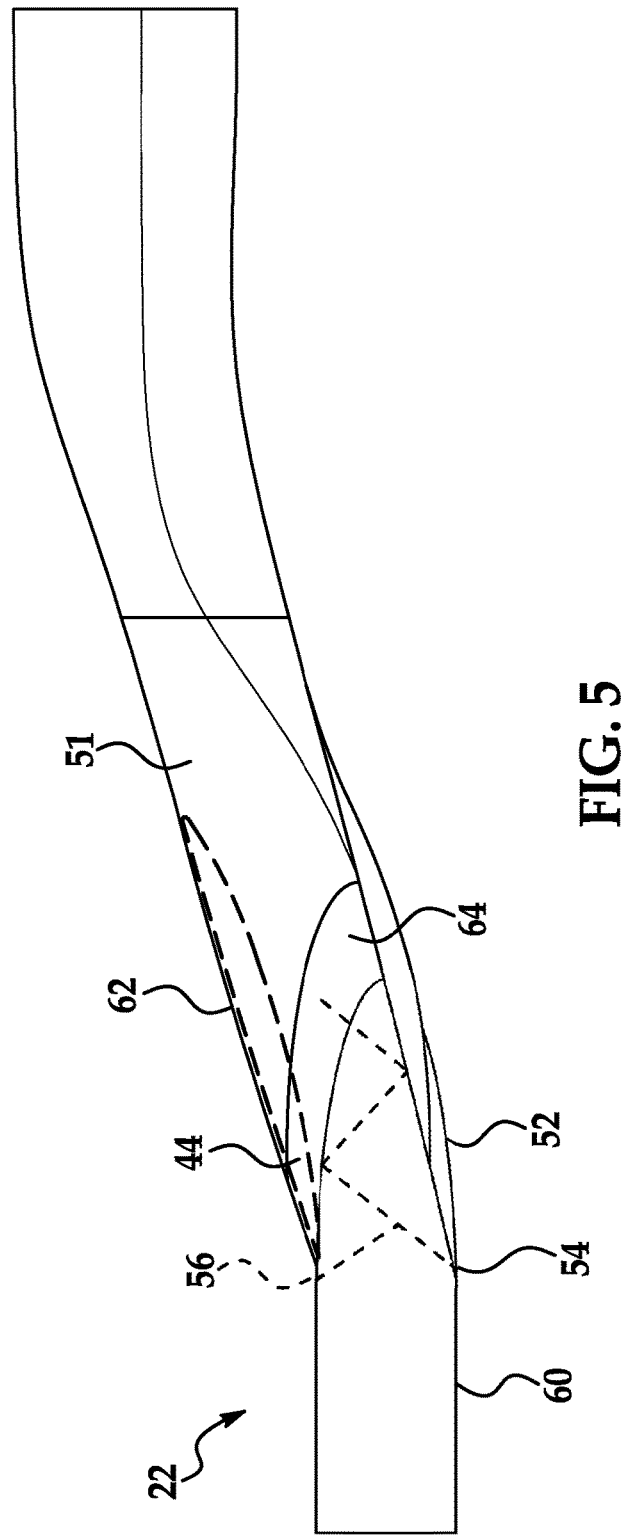
FIG. 4
FIG. 5

FLIGHT VEHICLE WITH AIR INLET ISOLATOR HAVING WEDGE ON INNER MOLD LINE

GOVERNMENT LICENSE RIGHTS

This invention was made with government support under contract HR0011-17-C-0025 awarded by the United States Department of Defense. The government has certain rights in the invention.

FIELD OF THE INVENTION

The invention is in the field of engines for flight vehicles such as airplanes, missiles, projectiles or access-to-space systems.

DESCRIPTION OF THE RELATED ART

Supersonic and hypersonic air-breathing engines, such as dual-mode ramjets/scramjets, include isolators. The isolator is typically a constant-area or slightly-monotonically-increasing area section located downstream of an air inlet throat, between the inlet and an engine/combustor. The purposes for the isolator may be to separate fluctuations between conditions in the inlet and the combustor, to provide a desired flow profile to the combustor, to reduce problems with inlet unstart and/or combustion stability. The isolator may also provide additional pressure rise upstream of the combustor when the combustor demands it.

Isolators can have shock systems set up along their lengths. The resulting shock train can create pressure rises that match those demanded by the combustor. This pressure rise must not allow pressure communications to travel through the isolator boundary layer and upstream past the inlet throat or allow the shock train to extend upstream of the inlet throat, both potentially resulting in unstart of the inlet. The isolator removes dynamic cross-talk between fluctuations in the inlet or combustor that can result in inlet unstart or engine flame-out/stall. Strong shock-boundary layer interactions can occur within the isolator, especially on the body-side of a vehicle where the boundary layer is thickest and has a more depleted energy profile. These strong shock interactions with weak boundary layers can result in lower pressure-rise capability and/or high distortion of the flow profile (mass flux, Mach Number, total pressure, etc.) at the isolator exit, which will be ingested by the engine and may reduce combustion efficiency or cause engine stall/flame-out.

Integrated airbreathing hypersonic vehicles usually suffer from highly distorted flow profiles at the combustor face, which is known to reduce combustion efficiency substantially and has the effect of reducing the vehicle's range and acceleration capabilities. Also, separated regions induced by strong shock-wave boundary layer interactions during isolator back pressured conditions, especially in isolators with oblique shock train systems, can cause separation zones in the isolator to propagate to the combustor face. These separation zones generally occur on the body-side and centerline of the vehicle where the boundary layer has built-up the thickest and where low momentum flow tends to collect with many high Mach Number inlet design methodologies. This opens-up the possibility for combustion gases to become entrained in the isolator with high potential to cause a burn-through of the isolator. Distorted inlet flow profiles generally have low momentum regions which can reduce the isolator maximum back pressure capability as well.

SUMMARY OF THE INVENTION

A flight vehicle engine isolator includes an inner-mold-line swept-back ramp or wedge that anchors a shock or shocks at a forward part of the wedge, such as at a bottom of the isolator.

A flight vehicle engine isolator includes an inner-mold-line swept-back ramp or wedge that improves flow mixing.

A flight vehicle engine isolator includes an inner-mold-line swept-back ramp or wedge that reduces or removes downstream/isolator exit flow separation (and thereby greatly reduces risk of isolator burn-through).

Removal of flow non-uniformities before they occur along the isolator length and removal of the majority of flow separations due to the isolator geometry reduces losses, allows the isolator to reach higher back pressures than it could otherwise.

The ability of the isolator features to create stronger shock anchoring at high back pressures also improves the maximum back pressure capability of an engine.

An isolator inner-mold-line geometry shaping may improve maximum throttle capability (maximum back pressure capability).

An isolator inner-mold-line geometry shaping improves off-design performance.

According to an aspect of the invention, a flight vehicle includes: a fuselage; and a propulsion system mechanically coupled to the fuselage. The propulsion system includes: an air inlet; an isolator downstream of the air inlet; and a combustor downstream of the isolator. The isolator includes a swept-back wedge on the inner-mold-line of the isolator. In operation a forward part of the wedge produces an oblique shock, and features of the wedge divert boundary-layer and core flow that is close to the surface of the wedge, radially outboard and circumferentially along the walls of the isolator as the flow proceeds axially downstream through the isolator, to improve flow mixing.

According to an embodiment of any paragraph(s) of this summary, the features of the wedge are an aft part of the wedge.

According to an embodiment of any paragraph(s) of this summary, the forward part of the wedge is at a bottom-centerline of the isolator; and the aft part of the wedge is along the outboard sides of the isolator.

According to an embodiment of any paragraph(s) of this summary, the oblique shock produced at the forward part of the wedge due to back pressure impositions is part of a shock train that also includes an additional oblique shock produced at a location on the isolator that is diametrically opposed to the forward part of the wedge.

According to an embodiment of any paragraph(s) of this summary, the swept-back wedge is a band around the isolator, with the band angled relative to an axial direction along the isolator.

According to an embodiment of any paragraph(s) of this summary, the forward part of the wedge is at a bottom of the isolator.

According to an embodiment of any paragraph(s) of this summary, the wedge has a maximum compression angle at the forward part.

According to an embodiment of any paragraph(s) of this summary, the compression angle tapers from the maximum at the bottom to a minimum at the aft part of the wedge, along sides of the isolator.

According to an embodiment of any paragraph(s) of this summary, the maximum compression angle is 5°-50°.

According to an embodiment of any paragraph(s) of this summary, the wedge has a sweep back angle of 20°-75°.

According to an embodiment of any paragraph(s) of this summary, the swept-back wedge is flush with walls of the isolator downstream of the wedge, so as to blend in with the downstream wedge shape.

According to an embodiment of any paragraph(s) of this summary, a minimum compression angle at an aft part of the wedge is zero.

According to another aspect of the invention, a method of reducing low energy flow in an isolator of a propulsion system of a flight vehicle includes the steps of: producing an oblique shock at a forward part of a swept-back wedge that is part of the isolator during back pressure demands from the combustor; and turning flow through the isolator using the wedge, wherein the wedge diverts boundary-layer and core flow, radially outboard and circumferentially along walls of the isolator as the flow proceeds axially downstream through the isolator, to thereby improve flow mixing.

According to an embodiment of any paragraph(s) of this summary, the method further includes the wedge producing additional weaker shocks.

According to an embodiment of any paragraph(s) of this summary, the method includes producing the oblique shock at a bottom of the isolator.

According to an embodiment of any paragraph(s) of this summary, turning the flow also includes directing the flow from the bottom and from sides of the isolator, to a top of the isolator.

According to an embodiment of any paragraph(s) of this summary, turning the flow includes diverting boundary layer streamlines toward running parallel to or parallel but moving outward conically to a leading edge of the wedge.

According to an embodiment of any paragraph(s) of this summary, a shock train of the oblique shocks produced by the swept-back wedge reduces a separation region at the top or sides of the isolator, relative to an isolator not having the swept-back wedge.

According to still another aspect of the invention, a method of reducing low energy flow in an isolator of a propulsion flowpath of a flight vehicle includes the steps of: setting up swept oblique shocks along the length of a swept-back wedge that is part of the isolator; turning the viscous and non-viscous flow outboard and upward with velocity vectors consistent with the swept-back wedge geometry and incoming flow conditions; and generating oblique shocks at intersections of sidewalls of the isolator and the swept-back wedge, to further instigate flow turning upward along the sidewalls.

According to an embodiment of any paragraph(s) of this summary, the method further includes flow through the isolator wrapping along the sidewalls and upward within the isolator, thereby reducing a separation zone within the isolator, and mixing in high energy flow with lower energy flow in an upper portion of the isolator.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 4 is a plan view of the isolator of FIG. 3.

FIG. 5 is a cutaway side view showing some aspects of flow through the isolator of FIG. 3.

DETAILED DESCRIPTION

A flight vehicle engine includes an isolator with a swept-back wedge to improve flow mixing. The wedge includes forward shock-anchoring locations, such as edges or rapidly-curved portions, that anchor oblique shocks in situations where the isolator has sufficient back pressure. The swept-back wedge may also create swept oblique shocks along its length. Boundary layer flow streamlines are diverted running parallel to or parallel but moving outward conically to the swept-wedge leading edge moving outboard and upward. This flow may create and propagate vortices as well, which may increase the energy of this flow and folds-in high energy non-viscous flow. The non-viscous flow outside the boundary layer is processed through the swept-back ramp shock and diverted outboard and upward as well, with velocity vectors consistent with the swept-back wedge geometry and incoming flow conditions. The outboard aft portion of the wedge close to and at the sidewall intersection may also induce shocks and divert flow near the walls closer toward the walls, and/or improve flow mixing, such as by diverting the collecting flow that has been directed toward this region upward along the sides of the isolator and toward the top of the isolator, where low-energy flow and/or a flow separation regions may be located.

Figure 1:
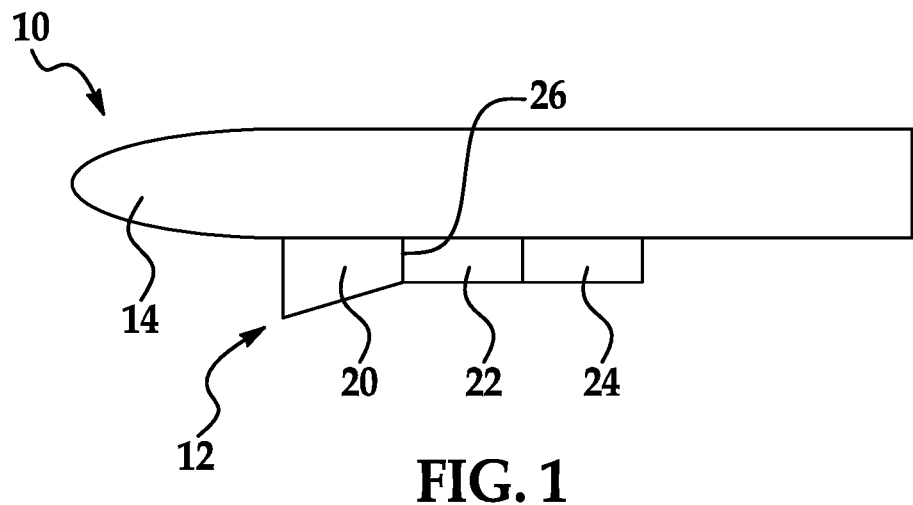
FIG. 1 is a schematic diagram of a flight vehicle according to an embodiment of the present invention.

FIG. 1 schematically shows an air vehicle 10 that is powered by a propulsion system 12 that is mechanically coupled to a fuselage 14. The air vehicle 10 may be a missile, projectile, an unmanned aircraft (an unmanned aerial vehicle or UAV), manned aircraft or an access-to-space vehicle. The air vehicle may have any of a variety of sizes, and any of a variety of operating conditions. In much of the description below the air vehicle 10 is described in terms of a high supersonic to hypersonic air vehicle, with a Mach number ranging from 4 to 6, or more broadly with a Mach number of 2 to 25. However the air vehicle 10 may operate at lower supersonic speeds (Mach number greater than one), or even at subsonic speeds.

The propulsion system 12 may be coupled to the fuselage 14 in any of a variety ways, including parts of the propulsion system 12 being integrally formed with parts of the fuselage 14. The fuselage 14 may have any of a variety of suitable shapes, and may include additional components for carrying out one or more operations of the air vehicle 10. Such additional components, to give a few non-limiting examples, may include control systems (such as for steering), lift-producing and/or control surfaces (such as wings, fins, or canards, either fixed in position or movable in whole or in part), communication systems, cooling systems, sensors or other data-collecting systems, and/or any of a variety of payloads.

Figure 2:
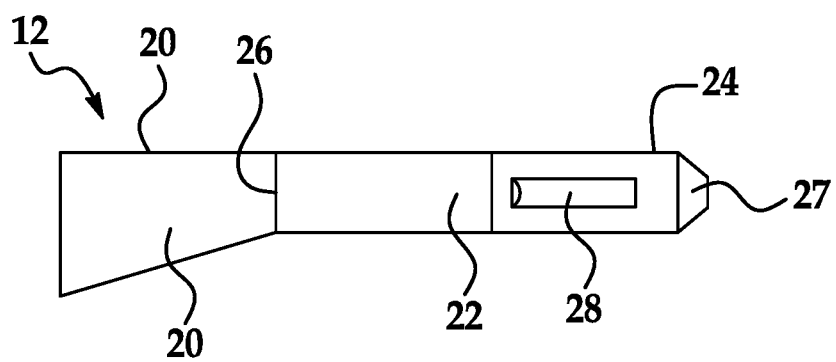
FIG. 2 is a schematic diagram showing components of an engine of the flight vehicle of FIG. 1.

With reference in addition to FIG. 2, the propulsion system 12 includes an air inlet 20, an isolator or diffuser 22, and a combustor or engine combustor 24. The air inlet 20 takes in air from the free air stream and compresses the air, with one or more shocks perhaps occurring as the flow is compressed. The compressed air then exits the air inlet 20 to enter into the isolator 22. There may be a throat 26, a minimum area location at the boundary between the air inlet 20 and the isolator 22. The isolator 22 functions to keep the shocks stable, isolates dynamic flow fluctuations between the inlet and engine, provides demanded pressure rises, and/or provides desired flow patterns at its downstream end, where the air passes from the isolator 22 to the combustor or engine 24. In the combustor 24 fuel is added to the air flow, mixed, combustion occurs, and the combusted flow is passed through a nozzle 27, producing thrust from the propulsion system 12, which is used to power the air vehicle 10. Combustion products are exhausted from a downstream end of the combustor 24 through the nozzle 27. The propulsion system 12 thus defines a flowpath or propulsion flowpath through the inlet 20, the isolator 22, the engine combustor 24, and the nozzle 27.

The combustor 24 may be any of variety of suitable devices for burning a fuel-air or fuel-oxidizer mixture and producing thrust. For example the combustor 24 (and/or the engine 12) may be a ramjet, a scramjet, a dual-mode ramjet/scramjet, or perhaps a turbojet. In FIG. 2 the combustor 24 is shown as having a turbine 28, but in many embodiments the combustor 24 has no turbine (or other moving parts).

The inlet 20 may have any of a variety of suitable shapes, for example being round, elliptical, or rectangular. The isolator 22 may have a general shape that makes the transition between a square, rectangular, trapezoidal or elliptical shape of the inlet 20 (to give a few examples) to a round or other-shaped combustor 24. The inlet 20 and the combustor 24 may be in line with each other, or may be offset from one another and at different angular orientations.

Figure 3:
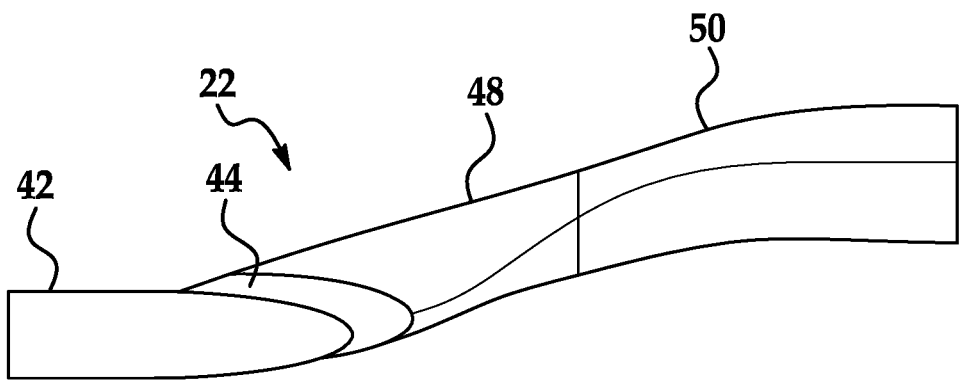
FIG. 3 is a side view of an isolator that may be part of the propulsion flowpath of FIG. 2.

FIGS. 3-5 shows further detail of an embodiment of the isolator 22. The isolator 22 has an S shape, with an inlet of the isolator 22 offset from an outlet of the isolator 22. The isolator 22 has (from upstream to downstream) an entrance region 42, a swept-back wedge 44, an isolator shape change and up-turn region 48, and a mix-out subsonic region 50. The region 50 may be one of subsonic flow during moderate to high back pressure operation, and may be supersonic otherwise. The illustrated isolator 22 sweeps upward from its entrance to its exit, but it will be appreciated that the isolator 22 may have any of a variety of other shapes, shape with no offset at all. In the description below there is reference to a top of the isolator 22, a bottom of the isolator 22, and sides of the isolator 22. However these references are to some extent arbitrary, and may correspond only to the illustrated embodiment.

The swept-back wedge 44 is on an inner surface 51 of the isolator. The swept-back wedge 44 on the bottom of the isolator 22 is a ramped portion of the wall of the isolator 22 and is configured to compress the flow to generate and anchor shocks at desired locations, and to turn some of the flow through the isolator 22 to encourage flow mixing and reduce separation regions throughout the isolator 22. Weaker shocks can setup parallel to the wedge 44 across the entire length of it, providing further anchoring. In the illustrated embodiment the wedge 44 is a band that stretches around a perimeter of the wall of the isolator 22, with the band being angled so as to be axially forward (closer to the upstream inlet) at the top on the symmetry plane of the isolator 22, and axially farther back (farther from the upstream inlet) at the sides of the isolator 22. A bottom part 52 of the wedge 44 acts as a shock generator and an anchor point 54 for strong oblique shocks within the isolator 22 when moderate to high pressure rises are demanded by the combustor 24. At the top of the isolator 22 an oblique shock is located at 56.

The angle of the wedge 44 at the bottom of the isolator 22 may be chosen to achieve the desired amount of compression. This compression sets up a shock train 60 to meet the demand. The compression surfaces of the wedge 44 divert boundary layer as well as high energy core flow that is near the isolator bottom surface to flow outboard and upward which reduces the size of a separation region 62, caused by the forward-most oblique shock, in which flow separates from the wall of the isolator 22, and recirculates therein. The band 44 may have varying wedge angles along its perimeter with the steepest angles in the center (at the bottom of the isolator 22 and this angle approaching zero as one moves outboard toward the bands widest parts 64 to the sidewalls. The bottom (forward) part 52 sets up a strong oblique shock, and the remainder of the wedge 44 diverts boundary-layer and some core flow (close to the boundary layer) outboard to the isolator sidewalls, to improve flow mixing. The swept-back wedge 44 may be flush with walls of the isolator 22 downstream of the wedge 44, so as to blend in with the downstream wedge shape. Alternatively there may be a discontinuity, such as a step, on the downstream side of the wedge 44. Such a discontinuity may be used to set up a desired shock orientation to re-orient velocity vectors, diverting or directing the flow as desired.

The band 44 may be tapered from the bottom 52 to the sides, with the compression angle of the wedge (the amount of compression) decreasing from a maximum value to zero (or a non-zero minimum). The (maximum) wedge compression angle may be 10°-30°, or more broadly 5°-50°, to give some (non-limiting) values. As an alternative to the use of a band, there may be wedges at discrete locations around a perimeter of the isolator, at different axial stations. As yet another additional alternative, the band along the top of the isolator only acts as an expansion surface, and can be blended into the surrounding geometry of the isolator 22. As yet another additional alternative, the band 44 may be have a constant compression wedge 44 angle across the entire surface at the bottom 52 of the isolator 22.

Figure 6:
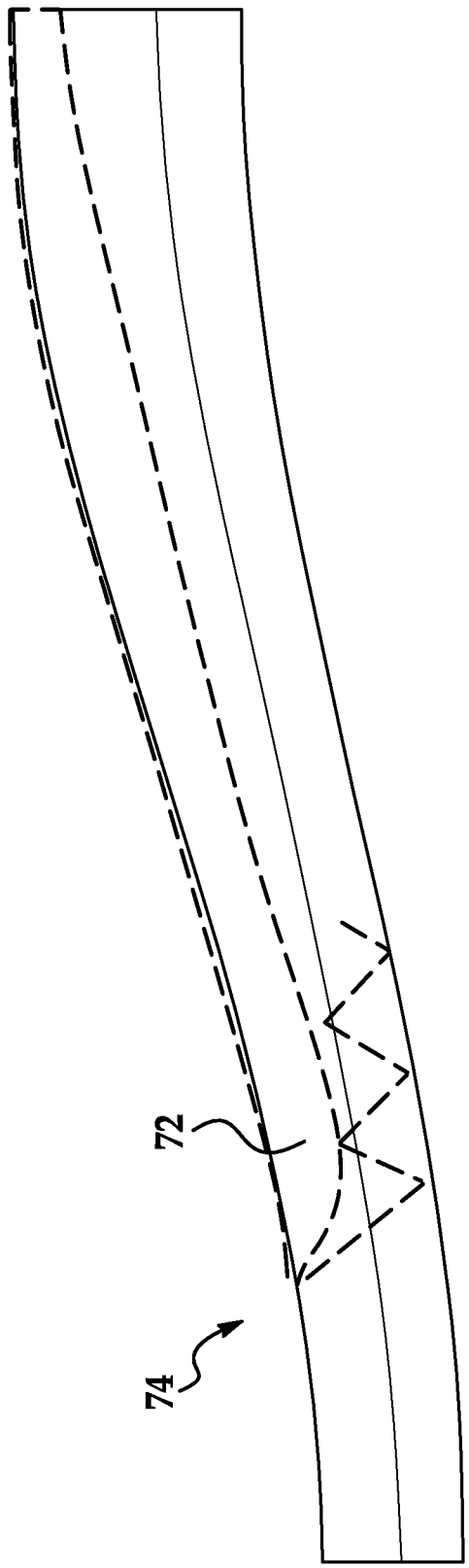
FIG. 6 is a cutaway side view of a prior art isolator.

With reference now to FIG. 6, the separation region 62 (FIG. 5) is contrasted with a much larger separation region 72 in a prior art isolator 74 that lacks the swept-back wedge 44 (FIG. 3) and other features of the isolator 22 (FIG. 3). Bifurcated isolator flows (low and high momentum flow splits) may occur at back pressured conditions due to either large S-duct heights, large isolator aspect ratios, large shape change requirements, too short of isolators, distorted inflows (in velocity vectors and/or mass flux), large or non-uniform boundary layer thickness inflows, inflow Mach Number and shock train structure, etc. The low energy flow on the top-half of the duct, such as in the separation region 72, can lead to reduced engine performance or burn-back of combustion gases in the isolator 22. Thus it is advantageous to reduce the separation region by flow diversion to instigate mixing and stop the propagation of the separation 72 region down the length of the isolator 22 early, in order to improve performance.

Features at the bottom of the isolator 22 help improve the desirable flow mixing. The wedge 44 has a drastically increasing geometry slope, with discrete or continuous but rapid geometry changes that create a swept compression ramp. This wedge 44, when placed correctly axially, with the right sweep angle and shock wedge angle, greatly increases flow upwash of the high energy flow around the inner-mold-line of the isolator 22. The swept feature also rolls more high energy flow toward the wall due to the large pressure gradients imposed by the swept shocks. This flow is subsequently deflected upwards, again increasing upwash. Duct shaping, when positioned correctly, creates a "whip" effect on the flow as well, further improving upwash. This shaping is accomplished by tailoring the swept-back wedge to sidewall geometry intersection and by a drastic duct height increase by either following the tangent angle at the downstream-end of the swept-back compression wedge or by further increasing the instantaneous upward angle of the isolator 22 immediately downstream of the swept-back wedge 44. Cross-sectional area distributions along the length of the isolator may be monotonically increasing, or alternatively these diffusion rates may be tailored along the length to achieve other specific goals. All of this upwash translates down the isolator 22 (in the direction downstream) and results in colliding of different flow streams and mixing with the low energy or separated flow that is present in the top or side portions of the isolator 22.

The wedge 44 may set up swept oblique shocks along its length. This may produce turning of the viscous and non-viscous flow outboard and upward with velocity vectors consistent with the swept-back wedge geometry and incoming flow conditions. Further, there may be generating of oblique shocks at intersections of sidewalls of the isolator and the swept-back wedge, further instigating flow turning upward along the sidewalls. Flow through the isolator 22 may be pushed from inboard locations outboard and wrap along the sidewalls and upward within the isolator 22, thereby reducing the separation zone within the isolator 22, and may mix in high energy flow with lower energy flow in an upper portion of the isolator 22.

The improved mixing and removal of the majority of flow separations due to the tailored isolator geometry reduces losses, allowing the isolator to reach higher back pressures. The ability of the features to create stronger shock anchoring at high back pressures also improves the maximum back pressure capability.

Bifurcated flows with low/high momentum flow disparities from top to bottom caused by oblique shock trains generally have separated flow regions in the low momentum regions, especially in highly constrained systems where isolator length is low or S-duct height is high and separations cannot be avoided. The above-mentioned geometric features that create upwash of the high energy flow around the circumference remove this separation and mitigate the potential of entraining combustion products from the engine into the isolator and subsequently burning through the isolator.

Oblique shocks are mentioned herein. It will be appreciated that normal shocks may also occur in some places as an alternative to oblique shocks.

Tailored isolator inner-mold-line geometry shaping encourages shock anchoring which improves off-design performance and consistency by keeping the shock train positioning consistent across a wide range of flight conditions and throttle (back pressure demand) settings. Also, the low momentum and separated regions in typical isolators change location and size based on operating condition, throttle setting and in time (transient conditions), all of which lead to distortion pattern changes at the combustor entrance which may reduce combustion efficiency if an active fuel injection scheme is not incorporated. Removing these variations by mixing-out the low energy flow regions improves consistency across the flight envelope and throttle settings and either simplifies the engine or improves combustion efficiency, both of which increase specific impulse (fuel efficiency) and/or thrust at a given throttle setting.

Figure 7:
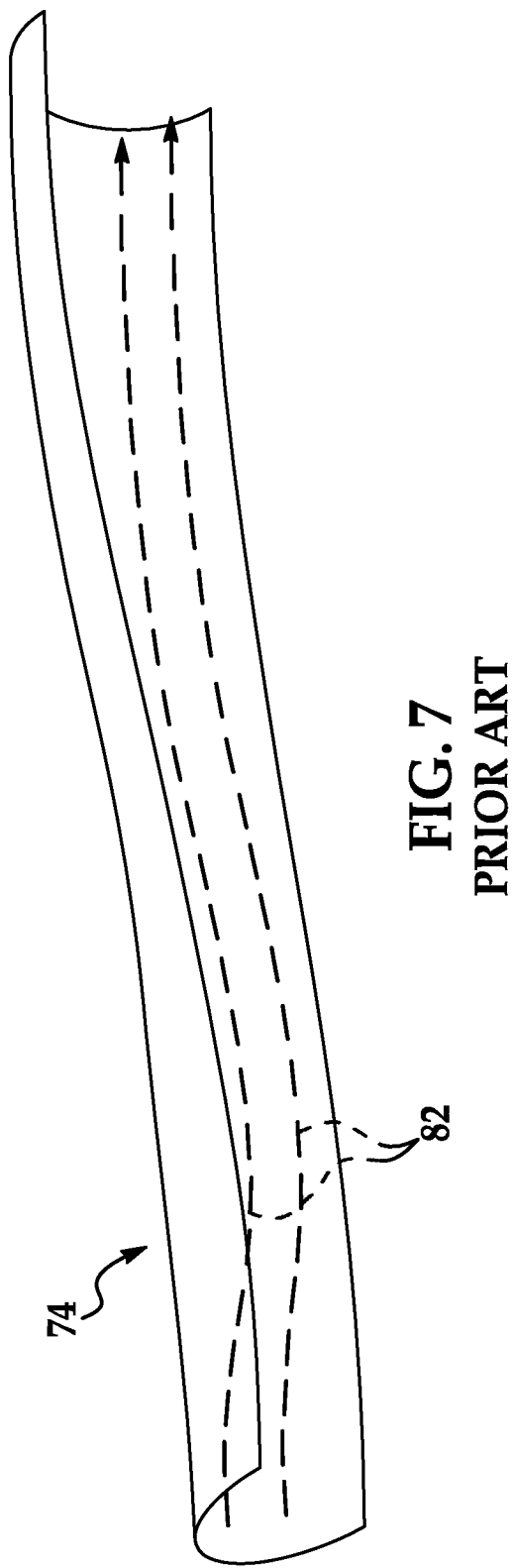
FIG. 7 is an oblique cutaway view showing streamlines of flow through the prior art isolator of FIG. 6.
Figure 8:
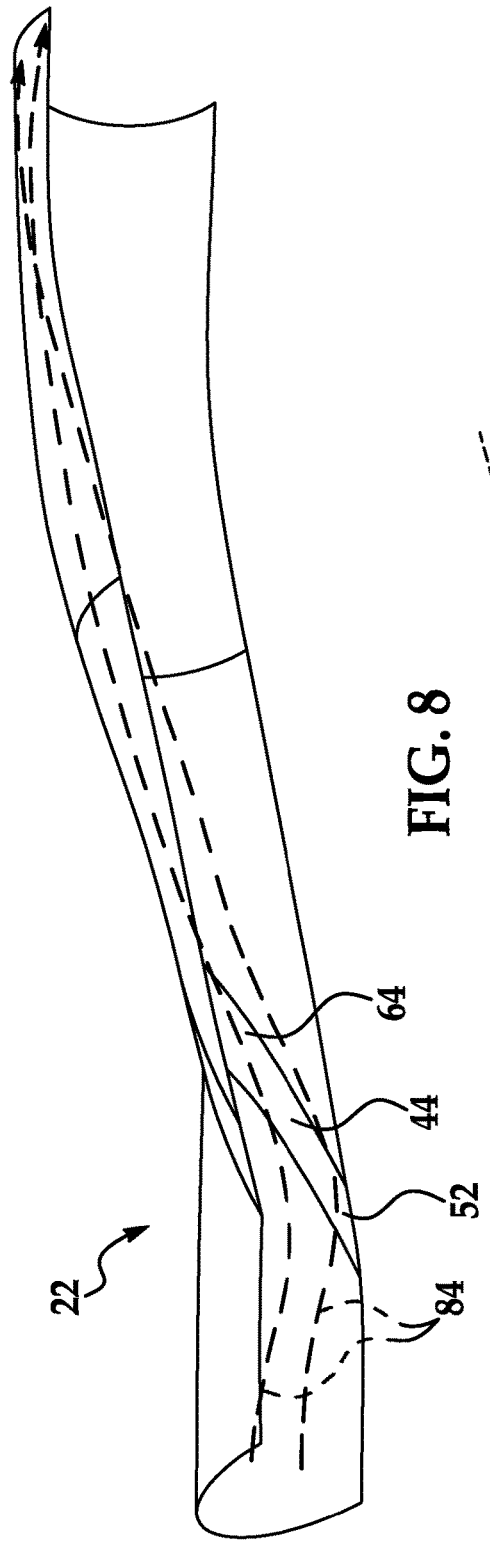
FIG. 8 is an oblique cutaway view showing streamlines of flow through the isolator of FIG. 3.

FIGS. 7 and 8 show streamlines for flow in a prior art isolator 74 (FIG. 7) and in an isolator 22 (FIG. 8) of the present invention. In the prior art isolator the streamlines 82 do not move much after they are processed through the initial shock in the back pressured oblique shock train. The low energy flow stays toward the top of the isolator 74 after the first (upstream) oblique shock separates flow from the top. High energy flow is pushed down by the oblique shock and stays toward the bottom of the isolator 74.

In the isolator 22 (FIG. 8) high energy flow streamlines, after the initial back pressure imposed oblique shock, near the isolator walls are deflected upward by oblique shocks anchored at the wedge 44. The wedge 44 also pushes high energy flow along the bottom surface from the centerline toward the side walls of the isolator 22. Downstream of the wedge 44 the flow, indicated by the streamlines 84, moves upward along the side walls, toward the top of the isolator 22. The diverted high-energy flow reduces in size (or eliminates) the separation region, which reduces this flow constriction on the top-side of the isolator 22 and allows high energy flow on the bottom-side to diffuse with the top flow more freely. The Mach Number of the flow can also be reduced more rapidly with the separation constriction gone to improve mixing as well. The diverted flow also mixes with the low-energy flow at the top of the isolator 22 to create a more uniform flow.

FIGS. 9-12 show some alternative embodiments, with different specific features than those of the isolator 22 (FIG. 3). In each of FIGS. 9-12 a prior art isolator 74 is shown along with the various alternate invention embodiments.

Figure 9:
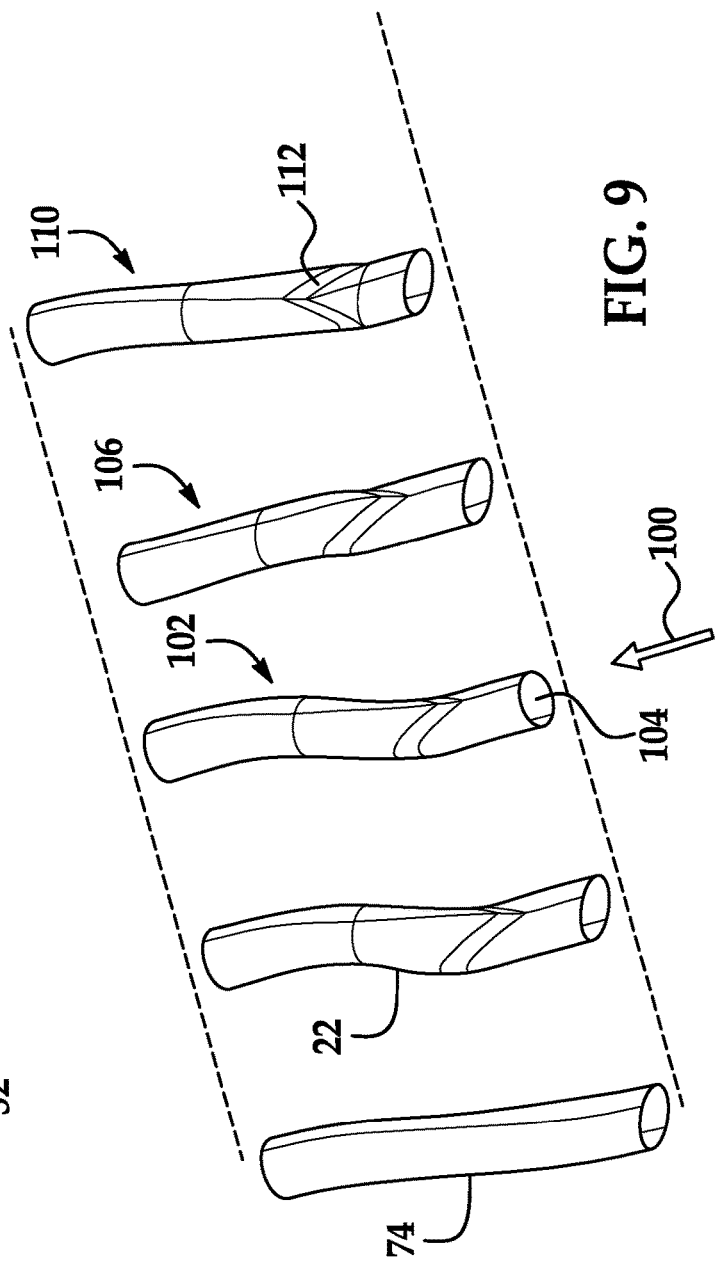
FIG. 9 is an oblique view showing some possible alternate embodiment isolators.

FIG. 9 shows some general variations in configuration, with a flow direction shown at 100. The prior art isolator 74 is shown, as is the isolator 22. An isolator 102 has a cylindrical entrance 104. An isolator 106 has a minimal-bend S shape, with less of an offset distance between axes of the inlet and exit. An isolator 110 has a reversed V-wedge 112 swept back wedge, with the forward parts of the wedge at the sides and the aft parts of the wedge at the top and bottom. This configuration has the potential to improve isolator exit distortion for inlet configurations that create bottom-side centerline low-energy regions or configurations where the oblique shock train forward-most foot is located on the bottom-side of the isolator. The reversed V-wedge 112 would divert flow from the sides to this region.

Figure 10:
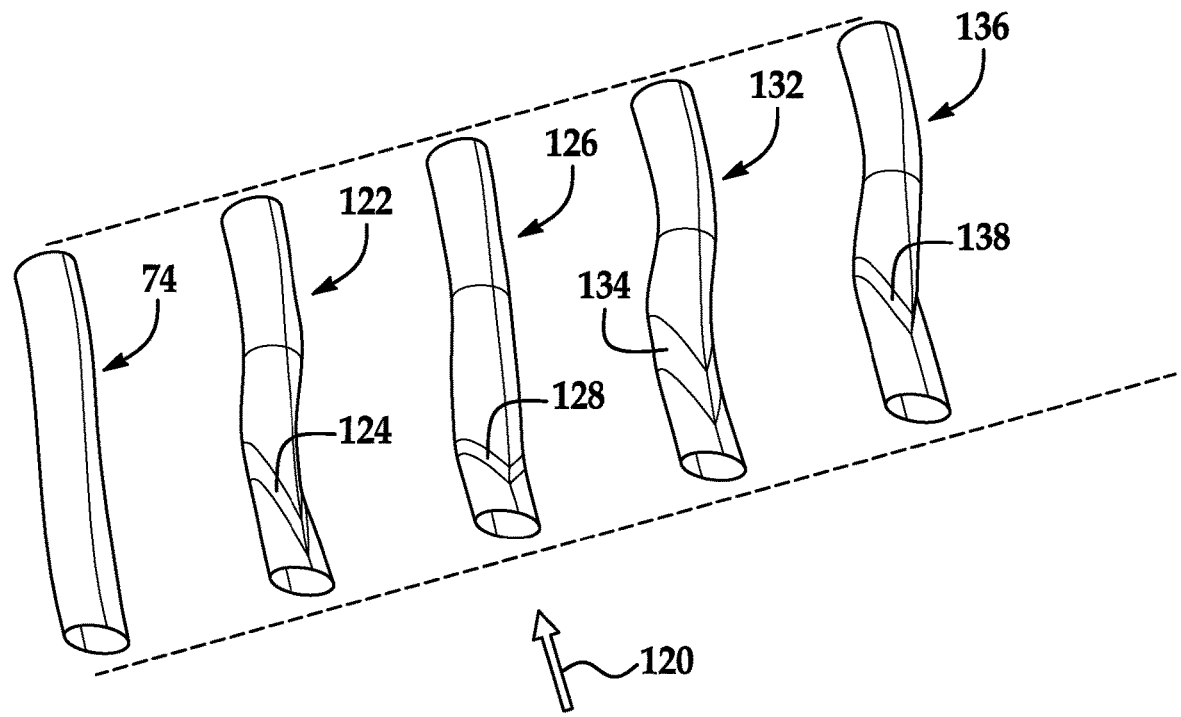
FIG. 10 is an oblique view showing additional alternate embodiment isolators.

FIG. 10 shows isolators that have some variations in the wedge configurations relative to the configuration shown in the isolator 22 (FIG. 3), along with the prior art isolator 74. A flow direction is shown at 120. An isolator 122 has an increased sweep angle of 75° on its wedge 124, while an isolator 126 has a decreased sweep angle of 45° on its wedge 128. These angles are relative to a flow direction, the axial direction along the length of the isolator 122. Sweep angle selection is a strong function of the propagating inlet shock train, velocity vectors and/or momentum distribution of this inflow, shear stresses, percent of normal shock the isolator is required to handle, S-duct height, isolator shape change required, isolator length, etc. Sweep back angles may be selected for desired performance, for example being 45°-65°, or 20°-75°, although other values are possible. An isolator 132 has a wedge 134 with an increased wedge angle (increased angling of the surface toward an axis of the isolator 132). An isolator 136 has a wedge 138 with a decreased wedge angle. The wedge angle or angles may be selected based on a number of factors (such as those listed above with regard to sweep angle), or to achieve any of a variety of effects.

Figure 11:
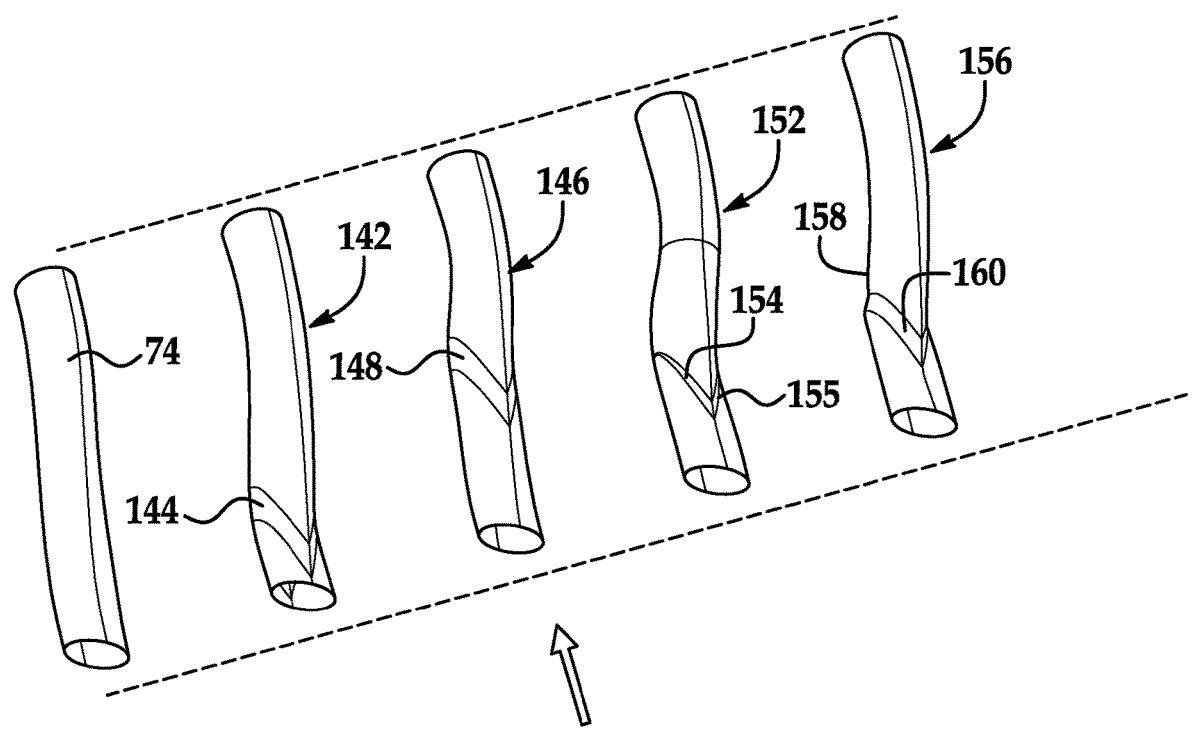
FIG. 11 is an oblique view showing some further alternate embodiment isolators.

FIG. 11 shows some possible variations in the placement of the wedge, and or in wedge and/or wall geometry configuration, with a flow direction shown at 150. The isolator 74 is the same prior art isolator shown in other figures. The isolator 142 has a wedge 144 that is shifted toward an entrance of the isolator 142, while the isolator 146 has an aft-shifted wedge 148. Axial positioning may be selected as a function of the factors described earlier with regard to wedge angle. A wedge may be located 1-2 hydraulic diameters from the entrance, or more broadly 0-4 hydraulic diameters from the entrance. The isolator 152 has a wedge 154 that has a rounded forward surface 155 over at least part of its circumference. This contrasts with a sharp edge that other wedges may have. It will be appreciated that a fillet may be as effective as a sharp edge in creating shocks, anchoring shocks and diverting the flow as intended.

FIG. 11 also shows an isolator 156 with sidewall compression, a narrowed diameter region 158 that is downstream of a swept back wedge ramp 160. This type embodiment may improve flow deflection toward the center and could be tailored to improve flow deflection upward as well.

Figure 12:
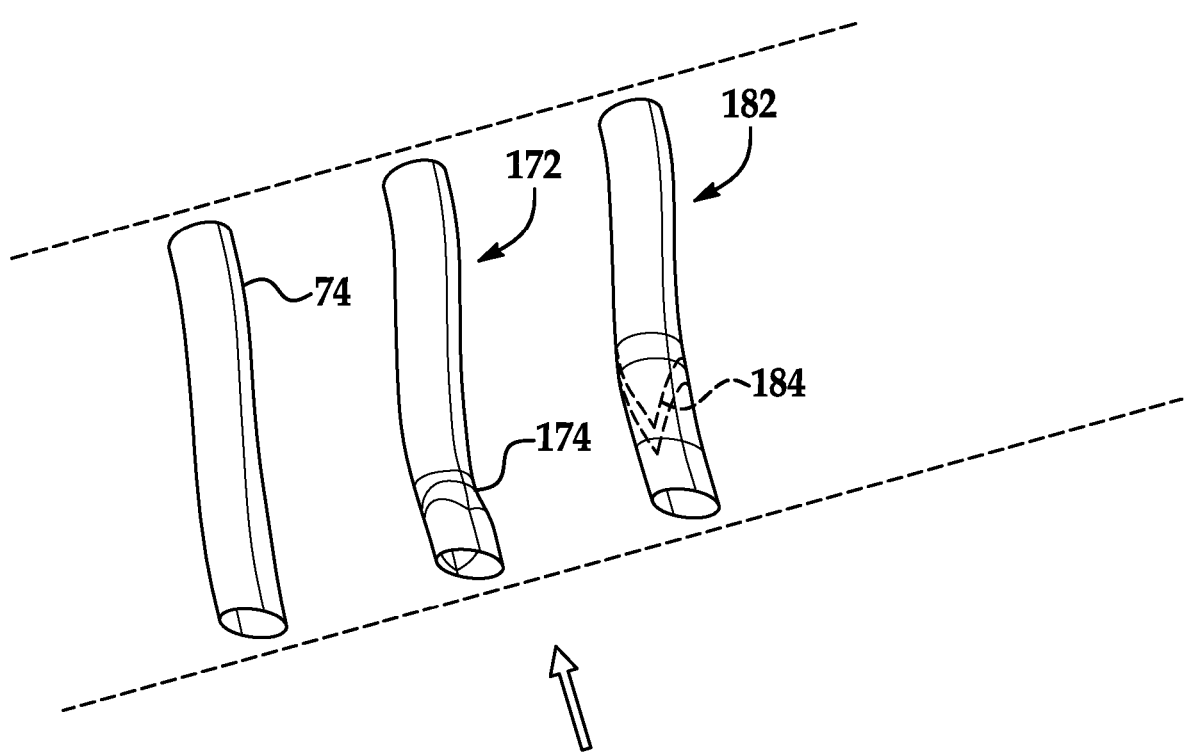
FIG. 12 is an oblique view showing still another alternate embodiment isolator.

FIG. 12 shows the prior art isolator 74 and an isolator 172 that has a sidewall only sweep wedge 174. Both sidewalls contain a swept-back wedge with the forward-most location toward the bottom-side of the isolator and a sweep-back proceeding upward and aft. This embodiment may provide the same benefits via similar flow physics via diverting bottom surface sidewall flow directly to the top surface. Shock anchoring may not be as strong as in some other embodiments, but flow mixing may be improved.

FIG. 12 also shows an isolator 182 that has a wedge 184 only over part of the circumference of the isolator 182. In the illustrated embodiment the wedge 184 is only along the bottom and sides of the isolator 182, but does not extend to the top of the isolator 182.

Further variations are possible. For example, all of the illustrated embodiment isolators have constant areas and constant cross-sections in the forward portion, before the swept-back wedge. This is not necessary or required, and other embodiments may have a different configuration.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flight vehicle comprising:
    a fuselage; and
    a propulsion system mechanically coupled to the fuselage;
    wherein the propulsion system includes:
        an air inlet;
        an isolator downstream of the air inlet; and
        a combustor downstream of the isolator where fuel is added; and
    wherein the isolator includes a swept-back wedge on an inner surface of the isolator, with the isolator having a rounded perimeter at an axial location of the swept-back wedge;
    wherein in operation a forward part of the wedge produces an oblique shock, and features of the wedge divert boundary-layer and core flow that is close to a surface of the wedge, radially outboard and circumferentially along the walls of the isolator as the flow proceeds axially downstream through the isolator, to improve flow mixing;
    wherein the swept-back wedge is a band around the rounded perimeter of the isolator, with the band angled relative to an axial direction along the isolator; and
    wherein the band is tapered, with a compression angle decreasing from a maximum value to a minimum value that is less than the maximum value.

2. The flight vehicle of claim 1, wherein the features of the wedge are an aft part of the wedge.

3. The flight vehicle of claim 2,
    wherein the forward part of the wedge is at a bottom-centerline of the isolator; and
    wherein the aft part of the wedge is along outboard sides of the isolator.

4. The flight vehicle of claim 1, wherein the oblique shock produced at the forward part of the wedge due to back pressure impositions is part of a shock train that also includes an additional oblique shock produced at a location on the isolator that is on an opposite side of the isolator, opposed from the forward part of the wedge.

5. The flight vehicle of claim 1, wherein the forward part of the wedge is at a bottom of the isolator, wherein the bottom of the isolator is farthest from the fuselage.

6. The flight vehicle of claim 5, wherein the wedge has a maximum compression angle at the forward part, wherein the maximum compression angle is the maximum angle in a direction away from the inner surface, where the wedge is joined to the inner surface.

7. The flight vehicle of claim 6, wherein the compression angle tapers from the maximum at the bottom to a minimum at the aft part of the wedge, along sides of the isolator.

8. The flight vehicle of claim 6, wherein the maximum compression angle of the wedge is 5°-50°.

9. The flight vehicle of claim 6, wherein the maximum compression angle of the wedge is 10°-30°.

10. The flight vehicle of claim 1, wherein the wedge has a sweep back angle, swept back in an axial flow direction, of 20°-75°.

11. The flight vehicle of claim 1, wherein the swept-back wedge transitions to be flush with walls of the isolator downstream of the wedge.

12. The flight vehicle of claim 1, wherein the wedge has a sweep back angle, swept back in an axial flow direction, of 45°-65°.

13. The flight vehicle of claim 1, wherein the band has varying wedge angle along the rounded perimeter, with a steepest wedge angle at a bottom of the isolator, furthest from the fuselage, and a reduced wedge angle at sides of the isolator.

\* \* \* \* \*